US012765462B2

(12) United States Patent
Van Den Berg

(10) Patent No.: US 12,765,462 B2
(45) Date of Patent: Oct. 20, 2026

(54) VEHICLE SYSTEM FOR PROCESSING OF A PRODUCT

(71) Applicant: LANVI PATENT B.V., Maassluis (NL)

(72) Inventor: Karel Van Den Berg, Maassluis (NL)

(73) Assignee: LANVI PATENT B.V., Maassluis (NL)

( * ) Notice: Subject to any disclaimer, the term of this patent is extended or adjusted under 35 U.S.C. 154(b) by 347 days.

(21) Appl. No.: 18/561,918

(22) PCT Filed: May 16, 2022

(86) PCT No.: PCT/IB2022/054523
§ 371 (c)(1),
(2) Date: Nov. 17, 2023

(87) PCT Pub. No.: WO2022/243834
PCT Pub. Date: Nov. 24, 2022

(65) Prior Publication Data
US 2024/0224865 A1 Jul. 11, 2024

(30) Foreign Application Priority Data
May 20, 2021 (NL) ..................................... 2028263

(51) Int. Cl.
*A01D 46/30* (2006.01)
*B25J 5/00* (2006.01)

(52) U.S. Cl.
CPC ................ *A01D 46/30* (2013.01); *B25J 5/00* (2013.01)

(58) Field of Classification Search
CPC .... G05D 1/0295; G05D 1/0265; A01D 46/30; B25J 5/00; B25J 5/007
See application file for complete search history.

(56) References Cited

U.S. PATENT DOCUMENTS 9,014,902 B1 * 4/2015 Murphy ................. G05D 1/027 701/26
10,071,893 B2 * 9/2018 High ....................... E01H 5/061
(Continued)

FOREIGN PATENT DOCUMENTS

CN 108908308 A 11/2018
CN 109005923 A 12/2018
(Continued)

OTHER PUBLICATIONS

International Search Report, issued in PCT/IB2022/054523, dated Sep. 2, 2022.
(Continued)

*Primary Examiner* — Ryan Rink
(74) *Attorney, Agent, or Firm* — Birch, Stewart, Kolasch & Birch, LLP

(57) ABSTRACT

A vehicle system for processing and transporting a product includes a first autonomous unmanned vehicle provided with automatic drive including wheels and a navigation device. The first autonomous vehicle being further provided with a power supply, a storage configured to store the product and a first coupler. The vehicle system includes a processing device provided with a processor configured to process the product. The processor includes a robot for performing processing operations, and the processing device include a second coupling means. The vehicle system further includes a controller. In a first state, the first and second couplers are uncoupled and detached from each other and at least the first autonomous unmanned vehicle moves separately, and in a second state, the couplers are coupled and engage with each other, and the first autonomous unmanned vehicle and the processing device together form an autonomous unmanned vehicle unit and as such move together.

12 Claims, 2 Drawing Sheets

A

B

(56) References Cited

U.S. PATENT DOCUMENTS

| | | | | |
|---|---|---|---|---|
| 12,090,651 | B2 * | 9/2024 | Chandler | B25J 11/0055 |
| 12,518,582 | B2 * | 1/2026 | Skaaksrud | G07C 9/27 |
| 2016/0236867 | A1 | 8/2016 | Brazeau et al. | |
| 2019/0287047 | A1 * | 9/2019 | Skaaksrud | B65D 90/18 |
| 2020/0281122 | A1 * | 9/2020 | Mor | A01F 15/00 |
| 2021/0339383 | A1 * | 11/2021 | Hahn | B25J 5/00 |
| 2021/0354304 | A1 * | 11/2021 | Jeromin | A63G 31/00 |
| 2021/0387328 | A1 | 12/2021 | Hahn | |
| 2022/0174877 | A1 * | 6/2022 | Requena | A01D 46/30 |
| 2024/0359318 | A1 * | 10/2024 | Cristache | B25J 5/007 |
| 2025/0289662 | A1 * | 9/2025 | Terpstra | B65B 35/36 |

FOREIGN PATENT DOCUMENTS

| | | | |
|---|---|---|---|
| DE | 10 2018 217 471 | A1 | 4/2020 |
| EP | 3 542 614 | A1 | 9/2019 |
| EP | 3 815 854 | A1 | 5/2021 |
| JP | 4-183318 | A | 6/1992 |
| JP | 2021-70082 | A | 5/2021 |

OTHER PUBLICATIONS

Written Opinion of the International Searching Authority, issued in PCT/IB2022/054523, dated Sep. 2, 2022.

* cited by examiner

VEHICLE SYSTEM FOR PROCESSING OF A PRODUCT

FIELD OF THE INVENTION

The invention relates to a vehicle system for processing a product, in particular for grabbing a consumer item in a warehouse or picking fruit in a greenhouse or in an orchard.

BACKGROUND OF THE INVENTION

In various industrial and agricultural sectors, repetitive operations, such as collecting goods for shipment or transportation, and picking fruit are becoming more and more automated, for example by the use of robots and unmanned vehicles.

In order to automate such operations in an optimum manner, a good logistics arrangement is required. The time which it takes to recharge or provide energy to the unmanned vehicles and the robots cannot be used to perform the operations. In addition, the robots and unmanned vehicles have to transport the goods or fruit in the warehouse or the greenhouse from the pick-up or picking location to a processing or packing location. The robot or unmanned vehicle is not able to process any further products during transportation to such a location.

It would therefore be desirable to provide a system which mitigates at least some of the perceived drawbacks of the prior art.

SUMMARY OF THE INVENTION

To this end, the invention comprises a vehicle system for processing and transporting a product, the system comprising:

a first autonomous unmanned vehicle provided with automatic driving means comprising wheels and navigation means, and furthermore provided with power supply means, storage means for storing the product and first coupling means, a processing device provided with processing means for processing the product, wherein the processing means comprise a robot for performing processing operations, and are provided with second coupling means; and a control device, wherein, in a first state, the first and second coupling means are uncoupled and detached from each other and at least the first autonomous unmanned vehicle moves separately, and wherein, in a second state, the coupling means of the first and the second autonomous unmanned device are coupled and engage with each other and the first autonomous unmanned vehicle and the processing device together form an autonomous unmanned vehicle unit and as such move together.

The vehicle system according to the invention comprises a first autonomous unmanned vehicle with automatic driving means comprising wheels and navigation means. In addition, the vehicle system comprises a processing device with processing means which perform a processing operation, such as the repetitive operation in a warehouse or horticultural greenhouse. The first autonomous unmanned vehicle is provided with additional provisions, such as power supply means, for example a battery, and storage means for storing the product which the processing device has processed. The first autonomous unmanned vehicle may then be referred to as the provision vehicle.

In a second state, the first autonomous unmanned vehicle and the processing device are coupled to each other, in which case the first and second coupling means engage with each other. The first autonomous unmanned vehicle and the processing device then move together as an autonomous unmanned vehicle unit. In the second state, the first autonomous unmanned vehicle may provide power to the processing device. Preferably, the power supply means of the first autonomous unmanned vehicle provide power to the processing device in the coupled state and/or the storage means pick up the product after processing by the processing means. A second battery of the processing device can then be charged by a first battery of the first autonomous unmanned vehicle. The second battery can be charged while the robot of the processing device performs processing operations. This ensures that the processing device can be charged on location and in situ and does not have to be taken to a remote charging station. This improves efficiency and effectiveness of the processing device. The vehicle system may furthermore comprise an automatic energy-charging device for the first autonomous unmanned vehicle. This makes it possible to charge the first battery of the first autonomous unmanned vehicle.

In one embodiment, the processing device may be stationary in the first state and the first autonomous unmanned vehicle may move the processing device in the second state. The processing device being stationary may be the result of an interrupted power supply by the uncoupled first state. Preferably, the processing device being stationary may be the result of the absence of automatic driving means. In the stationary state, the processing device is preferably able to perform the processing operation autonomously.

In one embodiment, the processing device comprises a second autonomous unmanned vehicle and, in the first state, the first and the second autonomous unmanned vehicles move separately from each other. Preferably, the second autonomous unmanned device can perform at least the processing operation in the uncoupled first state for a certain period of time, without the power supply means of the first autonomous unmanned device.

In a further embodiment, the processing device is provided with a storage device for temporarily storing the product during the first state. When the second autonomous unmanned device is uncoupled from the first autonomous unmanned device, but still performs processing operations, a storage device may be provided for temporarily storing products. This temporary storage may last for as long as the first state lasts.

In the coupled second state, the power supply means of the first autonomous unmanned vehicle can provide power to the processing device. In addition, the storage means may pick up the product after processing by the processing device. As soon as the first autonomous unmanned vehicle and the processing device enter the second state, storage of the product may be transferred to the storage means of the first autonomous unmanned vehicle. In the second state, transporting means are preferably provided between the storage means of the first autonomous unmanned vehicle and the storage device of the processing device, wherein the transporting means transport the product from the storage device to the storage means. The transporting means may be provided on the first autonomous unmanned vehicle or on the processing device.

The vehicle system can be used in different sectors. In one embodiment, the vehicle system is provided in a goods warehouse. The product to be processed then involves goods, preferably the product is a consumer item.

The robot of the processing means may then comprise a gripping arm for grabbing the product.

In another embodiment, the vehicle system is provided in a greenhouse for, for example, cultivation under glass, such as a greenhouse for plants or flowers, or in an orchard. In that case, the product to be processed is a fruit or flower. The robot of the processing means may then be a picking robot for picking a fruit or comprise a cutting robot for cutting flowers.

In a further embodiment, the vehicle system furthermore comprises a guide system for guiding the first autonomous unmanned vehicle and/or the processing device along a predetermined route while it/they move in the first and/or the second state. In both goods warehouses and greenhouses, facilities may be provided which can be used as a guide system for the first autonomous unmanned vehicle, the processing device and/or the autonomous unmanned vehicle unit. For example, a heating system in a greenhouse comprising a pipe system in which the pipes serve as a guide for the wheels of autonomous unmanned vehicles.

In the vehicle system, the first autonomous unmanned vehicle and the processing device are uncoupled in a first state and coupled in a second state.

The first autonomous unmanned vehicle may comprise a lifting device and the second state may be achieved by lifting the processing device by means of the lifting device, thereby forming an autonomous unmanned vehicle unit, wherein the first autonomous unmanned vehicle moves the autonomous unmanned vehicle unit in the second state.

In one embodiment, the first coupling means comprise a first engagement surface provided on at least a part of a top side of the first autonomous unmanned vehicle, and the second coupling means comprise a second engagement surface provided on at least a part of an opposite side of the processing device, and wherein, in the second state, the first autonomous unmanned vehicle and the processing device engage with each other across the entire first and second engagement surface. The opposite side of the processing device may comprise an underside of the processing device.

In another embodiment, the first coupling means comprise a first engagement means on a side of the first autonomous unmanned vehicle and the second coupling means comprise a second engagement means on an opposite side of the processing device, wherein the first and second engagement means engage with each other in the second state.

Examples of suitable coupling means are a towing coupling with a ball coupling, a magnetic coupling, but also an electric coupling by means of induction (wireless charging) is encompassed by the coupling means.

The autonomous unmanned devices are then coupled one behind the other, wherein the first autonomous unmanned vehicle may pull or push the processing device, depending on the direction of travel and the locations of the autonomous unmanned devices with respect to each other.

Preferably, the control device can send a signal to the first autonomous unmanned vehicle, with the first autonomous unmanned vehicle moving towards the processing device after it has received the signal. In this embodiment, the control device controls the point in time at which the first autonomous unmanned vehicle moves towards the processing device. In addition, the processing device may previously have sent the control device a signal in order to call the autonomous unmanned vehicle. As a result thereof, the processing device is able to control the autonomous unmanned vehicle via the control device.

In one embodiment, the vehicle system comprises one or more of the processing device and one or more of the first autonomous unmanned vehicle, wherein the number of first autonomous unmanned vehicles is greater than or equal to the number of processing devices. In order to use the processing device efficiently, it is advantageous if more than one autonomous unmanned vehicle can be coupled to the processing device at a time.

DETAILED DESCRIPTION OF THE INVENTION

Figure 1:
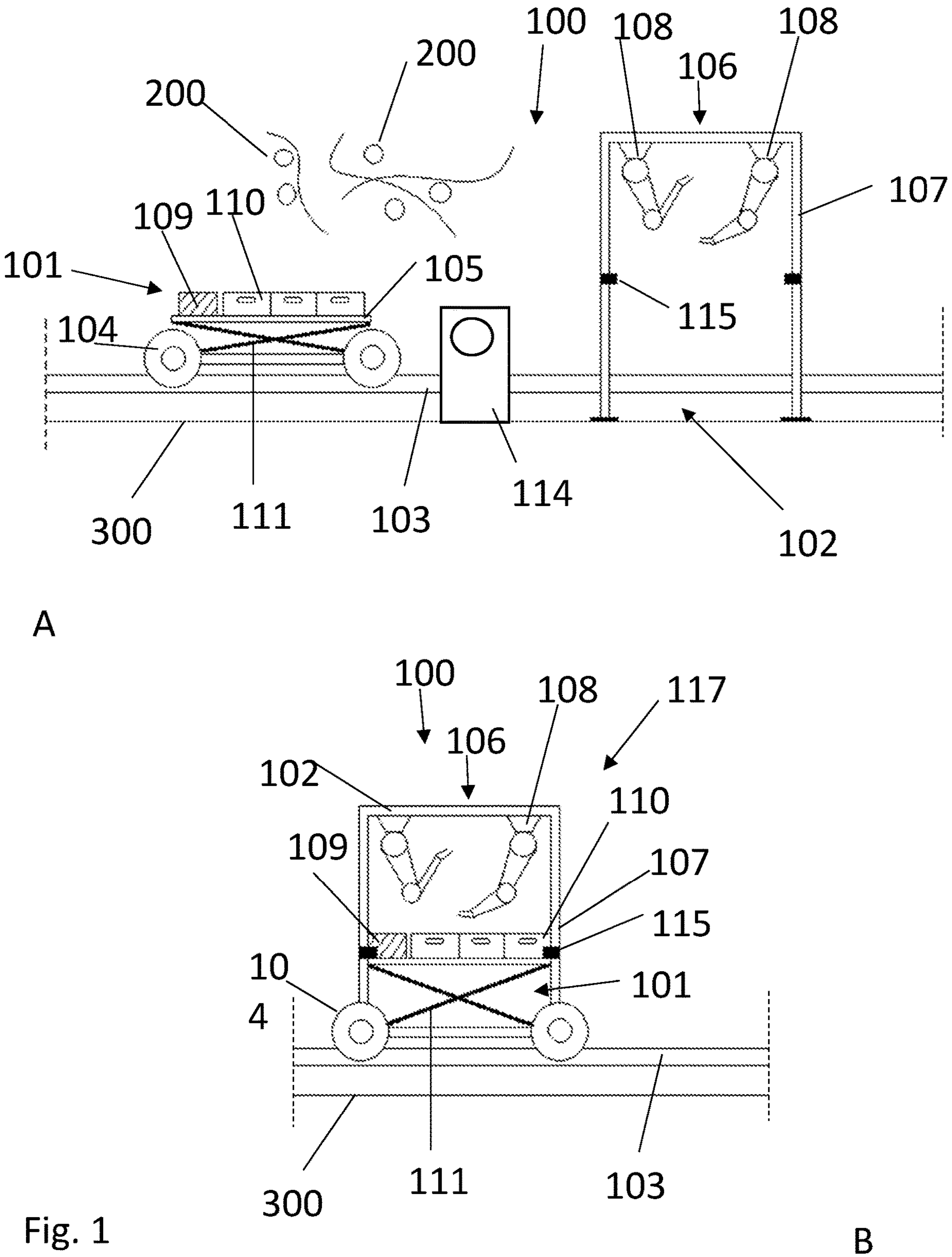
FIG. 1 shows an embodiment of the vehicle system according to the invention.

FIG. 1 shows a vehicle system 100 comprising a first autonomous unmanned vehicle 101, a processing device 102 and a guide system 103. FIG. 1A shows the first autonomous unmanned vehicle 101 and the processing device 102 in an uncoupled first state. The processing device 102 is provided with a robot 106 for processing products 200, in this embodiment a picking robot for picking fruit. The processing device 102 comprises a frame 107 which rests on a ground surface 300 of a greenhouse (not shown). In the frame 107, the picking robot 106 is provided with two robot arms 108, in this case picking arms. Second coupling means 115 are provided in the frame 107 for coupling to the first autonomous unmanned vehicle.

The frame 107 is open up to at least a height at which the first autonomous unmanned vehicle 101 is able to enter and assume a second coupled state, see FIG. 1B, in order to form an autonomous unmanned vehicle unit 117. The processing device 102 is stationary in the first uncoupled state (see FIG. 1A), and is not able to move or perform operations by itself without the first autonomous unmanned vehicle 101.

The first autonomous unmanned vehicle 101 is provided with automatic driving means including wheels 104. In a collection container 109, a control device, navigation means and power supply means, such as a battery, are provided. In addition, the first autonomous unmanned vehicle 101 has storage means 110 for storing the fruit 200 after it has been picked by the picking robot 106. In the uncoupled first state, the first autonomous unmanned vehicle 101 is able to move by itself.

The vehicle system 100 furthermore comprises an automatic energy-charging device 114 for charging the power supply means of the first autonomous unmanned vehicle 101. In addition, the vehicle system 100 comprises a guide system 103 consisting of guides which run through the greenhouse and which guide the first autonomous unmanned vehicle 101 or the autonomous unmanned vehicle unit 117 when moving through the greenhouse. This may be, for example, the heating pipes in a greenhouse, or a strip which is inserted into the floor of a greenhouse.

FIG. 1B shows the first autonomous unmanned vehicle 101 and the processing device 102 in the first coupled state, thereby forming the autonomous unmanned vehicle unit 117. The first autonomous unmanned vehicle 101 comprises a lifting device 111 which is in the raised position in the coupled state in order to couple the first coupling means 105 and the second coupling means 115 to each other. In the embodiment from FIG. 1, the coupling means 105, 115 are configured as contact surfaces which touch each other when the first autonomous unmanned vehicle 101 has entered the frame 107 of the processing device 102 and the lifting device 111 is in the raised position. The contact surfaces comprise a first engagement surface 105 provided on a top side of the first autonomous unmanned vehicle, and a second engagement surface 115 provided on an underside of the processing device 102. In the coupled second state, the first autonomous unmanned vehicle 101 and the processing device 102 engage with each other across the entire first and second engagement surface 105, 115.

In the coupled state, as illustrated in FIG. 1B, the picking robot 106 picks the fruit 200 using the picking arms 108. After picking, the picking arm 108 holds the fruit 200 and the picking arm 108 moves towards the storage means 110, in the form of containers, so that the fruit 200 can be stored in the storage means 110. When the storage means 110 are full, the first autonomous unmanned vehicle 101 will uncouple from the processing device 102, in other words, the coupling means 105, 115 will detach from one another. In the uncoupled state, the processing device 102 will be stationary and not pick any fruit 200. The first autonomous unmanned vehicle 101 comprising the full storage means 110 will travel to a dispensing point (not shown) to deposit the fruit 200 and to empty the storage means 110. The first autonomous unmanned vehicle 101 comprising the empty storage means 110 can then travel back to the processing device 102 and couple itself thereto.

Figure 2:
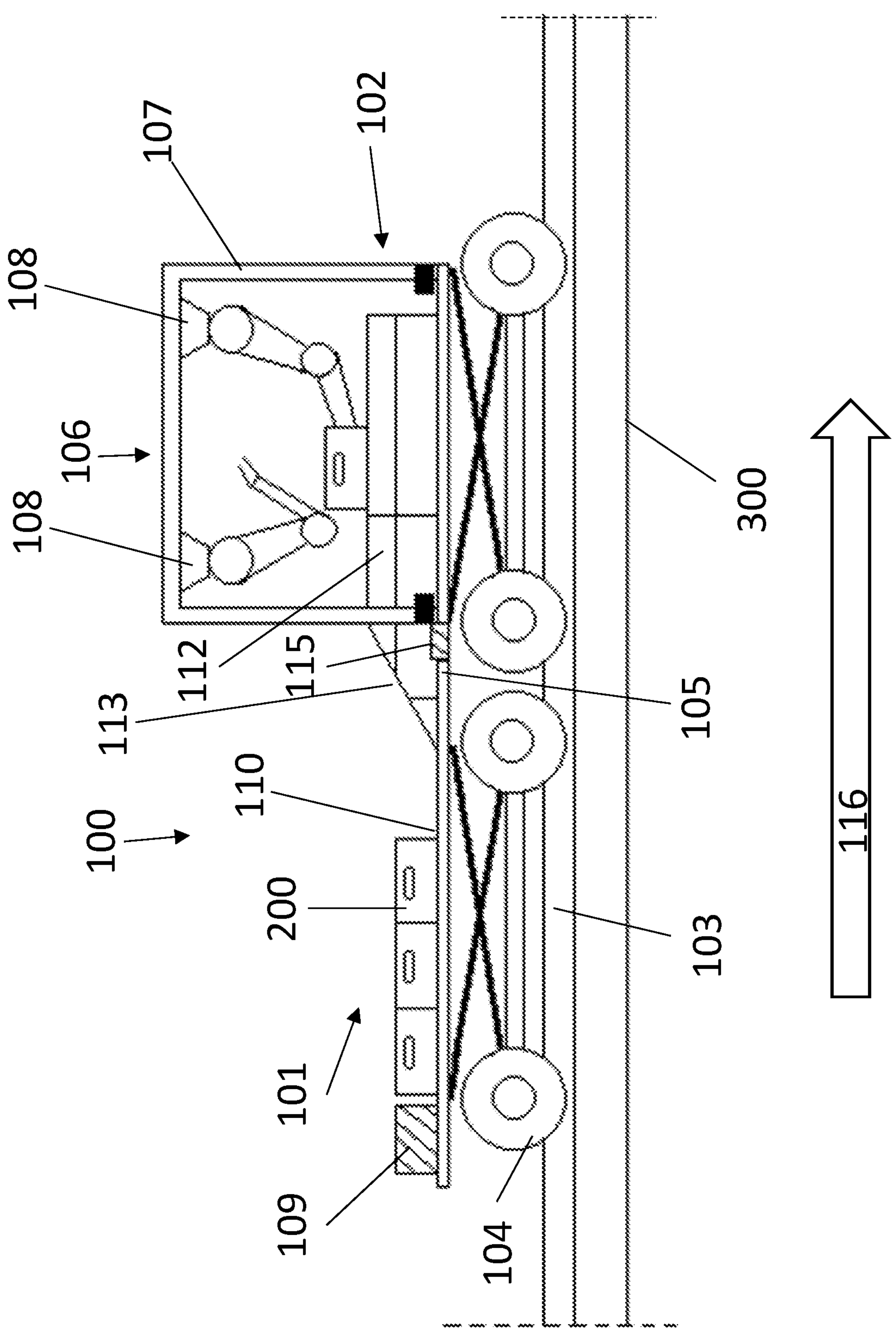
FIG. 2 shows a further embodiment of the vehicle system according to the invention.

FIG. 2 shows a further embodiment of the vehicle system 100, wherein the first autonomous unmanned vehicle 101 and the processing device 102 are in the coupled state and form the autonomous unmanned vehicle unit. The coupling means 105, 115, comprise a first engagement means 105 on a front side of the first autonomous unmanned vehicle 101 and a second engagement means 115 on an opposite side of the processing device 102, viewed in the direction of travel indicated by the arrow 116. In the coupled state, the first and the second engagement means 105, 115 engage with each other.

In the coupled state, the power supply means in the collection container 109 of the first autonomous unmanned vehicle 101 provide power to the processing device 102, and the storage means 110 receive the product after it has been processed by the processing device. The processing device 102 is provided with a storage device 112 for temporarily storing the product 200 after processing by the processing device 106, in this embodiment a robot with gripping arms 108. The temporary storage is provided for the first uncoupled state in which the processing device 102 processes products 200 by itself, i.e. without the first autonomous unmanned vehicle 101.

In this embodiment, the storage means 110 are an upper surface of the first autonomous unmanned vehicle 101 on which the product 200 is placed.

In the coupled second state, transporting means 113, such as a conveyor belt, are provided between the storage means 110 of the first autonomous unmanned vehicle 101 and the storage device 112 of the processing device 102. The transporting means 113 transport the product 200 from the temporary storage device 112 to the storage means 110. When the storage means 110 are full, the first autonomous unmanned vehicle 101 uncouples itself from the processing device 102 and travels to a dispensing point (not shown) in order to dispense the products 200 and empty the storage means 110. The first autonomous unmanned vehicle 101 with the storage means 110 empty can then travel back to the processing device 102 and couple itself thereto again. In the meantime, the robot 106 can process a number of products 200 and temporarily store them in the storage device 112. After coupling of the first autonomous unmanned vehicle 101 has taken place, the products are transported to the storage means 110 of the first autonomous unmanned vehicle 101.

LIST OF COMPONENTS

100. Vehicle system
101. First autonomous unmanned vehicle
102. Processing device/second autonomous unmanned vehicle
103. Guide system
104. Wheels
105. First coupling means/first engagement surface
106. Robot
107. Frame
108. Robot arm
109. Collection container
110. Storage means
111. Lifting device
112. Storage device
113. Transporting means
114. Charging device
115. Second coupling means/second engagement surface
116. Direction of travel
117. Autonomous unmanned vehicle unit
200. Product
300. Ground surface

The invention claimed is:

1. A vehicle system for processing and transporting a product, provided in a greenhouse for cultivation under glass, wherein the system comprises:

a first autonomous unmanned vehicle provided with an automatic drive comprising wheels and a navigation device, the first autonomous unmanned vehicle being further provided with a power supply with a first battery, a storage configured to store the product and a first coupler;

a processing device provided with a processor configured to process the product, and a second battery, wherein the processor comprises a robot for performing processing operations, the processing device being further provided with a second coupler, wherein the robot comprises a picking robot for picking a fruit, wherein the product is a fruit; and a controller, wherein the processing device comprises a second autonomous unmanned vehicle, wherein the vehicle system is configured to operable and switchable between a first state and a second state, wherein in the first state, the first and second couplers are uncoupled and detached from each other and the first and the second autonomous unmanned vehicles move separately from each other, and wherein, in the second state, the first and second couplers are coupled and engage with each other, and the first autonomous unmanned vehicle and the processing device together form an autonomous unmanned vehicle unit and as such move together, and the power supply of the first autonomous unmanned vehicle is configured to provide power to the processing device to charge the second battery while the robot of the processing device performs processing operations.

2. The vehicle system according to claim 1, wherein the processing device is provided with a storage device for temporarily storing the product during the first state.

3. The vehicle system according to claim 1, further comprising an automatic energy-charging device for the first unmanned autonomous vehicle.

4. The vehicle system according to claim 1, wherein the vehicle system further comprises a guide system for guiding the first autonomous unmanned vehicle and/or the processing device along a predetermined route while moving in the first and/or the second state.

5. The vehicle system according to claim 1, wherein the robot comprises a gripping arm for grabbing the product.

6. The vehicle system according to claim 1, wherein the product is a consumer item.

7. The vehicle system according to claim 1, wherein the first autonomous unmanned vehicle comprises a lift and the second state is achieved by raising the processing device with the lift, thereby forming the autonomous unmanned vehicle unit, wherein the first autonomous unmanned vehicle moves the autonomous unmanned vehicle unit in the second state.

8. The vehicle system according to claim 7, wherein the first coupler comprises a first engagement surface provided on at least a part of a top side of the first autonomous unmanned vehicle, and the second coupler comprises a second engagement surface provided on at least a part of an opposite side of the processing device, and wherein, in the second state, the first autonomous unmanned vehicle and the processing device engage with each other across the entire first and second engagement surface.

9. The vehicle system according to claim 1, wherein the first coupler comprises a first engagement on a side of the first autonomous unmanned vehicle and the second coupler comprises a second engagement on an opposite side of the processing device, wherein the first and second engagement engage with each other in the second state.

10. The vehicle system according to claim 2, wherein, in the second state, a transport device is provided between the storage of the first autonomous unmanned vehicle and the storage device of the processing device, wherein the transport device is configured to transport the product from the storage device to the storage.

11. The vehicle system according to claim 1, wherein the controller is configured to send a signal to the first autonomous unmanned vehicle, with the first autonomous unmanned vehicle moving towards the processing device after the first autonomous unmanned vehicle has received the signal.

12. The vehicle system according to claim 1, comprising one or more of the processing device and one or more of the first autonomous unmanned vehicle, wherein the number of the first autonomous unmanned vehicles is greater than or equal to the number of processing devices.

* * * * *